United States Patent [19]
Vignotto et al.

[11] Patent Number: 6,082,905
[45] Date of Patent: Jul. 4, 2000

[54] SEALING ASSEMBLY FOR A ROLLING BEARING

[75] Inventors: Angelo Vignotto, Turin; Carlo Maldera, Giaveno, both of Italy

[73] Assignee: SKF Industrie S.p.A., Turin, Italy

[21] Appl. No.: 09/151,850

[22] Filed: Sep. 11, 1998

[30] Foreign Application Priority Data

Sep. 12, 1997 [IT] Italy .................................. TO97A0812

[51] Int. Cl.⁷ .................................................. F16C 33/78
[52] U.S. Cl. .......................................... 384/484; 384/486
[58] Field of Search .................... 384/477, 484, 384/485, 486

[56] References Cited

U.S. PATENT DOCUMENTS

| | | | |
|---|---|---|---|
| 4,043,620 | 8/1977 | Otto | 384/485 |
| 4,377,312 | 3/1983 | Zackrisson | 384/485 |
| 4,664,538 | 5/1987 | Galbato | 384/477 |
| 4,863,292 | 9/1989 | Dreschmann et al. | 384/482 |
| 5,217,137 | 6/1993 | Andrews | 384/484 X |
| 5,370,404 | 12/1994 | Klein et al. | 384/484 X |
| 5,385,410 | 1/1995 | Shirai et al. | 384/446 |
| 5,454,647 | 10/1995 | Otto | 384/486 |
| 5,695,290 | 12/1997 | Mondak et al. | 384/485 |

FOREIGN PATENT DOCUMENTS

| | | |
|---|---|---|
| 0 753 679 | 1/1997 | European Pat. Off. . |
| 0 807 775 | 11/1997 | European Pat. Off. . |
| 196 44 744 | 5/1998 | Germany . |

OTHER PUBLICATIONS

A photocopy of the European Patent Office Search Report for EP 98 11 7254.7.

*Primary Examiner*—Thomas R. Hannon
*Attorney, Agent, or Firm*—Merchant & Gould P.C.

[57] ABSTRACT

A sealing assembly for rolling bearing comprises a shield interference fitted to a first race of the bearing. The shield comprises a rigid support having an axial sleeve portion for connection to the first race, and a radial flange portion extending towards the second race of bearing. The support forms a U-fold acting as an axial stopping means for co-operating with a mating surface of the first race to axially lock the shield with respect to said first race.

12 Claims, 3 Drawing Sheets

SEALING ASSEMBLY FOR A ROLLING BEARING

DESCRIPTION

The present invention refers to the sealing assembly for a rolling bearing, particularly for rolling bearings to be mounted on motor vehicle wheel hubs.

As known, rolling bearings a generally equipped with a sealing assembly mounted between the outer race and the inner race for protecting the rolling bodies of the bearing from foreign contaminants and, at the same time, keeping the lubricating grease within the bearing.

EP-A-0 807 775 discloses a sealing assembly comprising a first metal shield integral with the outer fixed race of the bearing and a second metal shield integral with the inner rotating race of the bearing. Each shield has a respective sleeve portion to be forcedly fixed on the respective bearing race and a flange portion extending towards the opposite race to act as a barrier. Particularly, the flange portion of the second shield acts as a centrifuging element for expelling water and dust during rotation of the inner bearing race.

To ensure watertight sealing, the first shield carries a V-shaped annular elastomeric sealing lip, adapted for sliding against the sleeve portion and the flange portion of the second shield.

The force fitting of the second shield to the inner bearing race is generally attained by means of an interference metal-to-metal coupling. Owing to manufacturing tolerances, there my be discontinuities in this coupling, which may allow leakage between the bearing race and the relevant sleeve portion of the shield.

To overcome this inconveience, it is known to equip the second shield with a rubber coating interposed between the sleeve portion and the bearing race to which such sleeve portion is mounted thereby providing an interference fitting of the shield on the relevant bearing race of the kind rubber/metal.

In this came, the rubber coating can deform to correct geometrical errors of the coupling, but it becomes difficult to obtain a correct axial positioning of the shield owing to the deformation which the rubber undergoes during and following the coupling operation. This problem is usually solved by forming the rubber coating of the shield with an annular tooth adapted for snap-fitting in a corresponding groove of the bearing race, possibly dimensioned so as to compensate said deformation of th rubber. However, the strength of such a force fitting, both axially and circumferentially, is definitely lower than that attained by metal-metal couplings.

It is an object of the present invention to provide a sealing assembly capable of overcoming the above prior art drawbacks. Particularly, it is an object of the present invention to provide a sealing assembly of a simple and economical construction and assembling.

According to a first aspect of the present invention, there is provided a sealing assembly for a rolling ring, said bearing comprising a first and a second race defining therebetween a cavity housing rolling bodies, said sealing assembly comprising a first shield adapted to be interferece fitted to said first race, and said first shield comprising a rigid support, maid support in turn comprising an azial sleeve portion for connection to the first race, and a radial flange portion extending towards said second race; wherein said first shield comprises axial stopping mans co-operating with a mating surface of maid first race to axially lock said first shield with respect to said first race.

According to a second aspect of the present invention, there is provided a rolling bearing, comprising a first and a second race defining therebetween a cavity housing rolling bodies, and at least one sealing assembly interposed between said first and second races at an end of the bearing for sealing said cavity, said sealing assembly comprising at least a first shield integral with said first race, said first shield comprising in turn a rigid support having an axial sleeve portion fitted with interference in a seat of the first race and a radial flange portion extending towards the second race, wherein:

said first race provides a surface for axial abutment: and said first shield has axial abutment means for cooperating in contact against said axial about surface for axially locking the first shield relative to said first race and elastomric sealing means gripped between said axial abutment means and said axial abutment surface.

In order that the present invention my be well understood, there will now described a few preferred embodiments thereof, given by way of example, reference being made to the accompanying drawings, in which.

Figure 2:
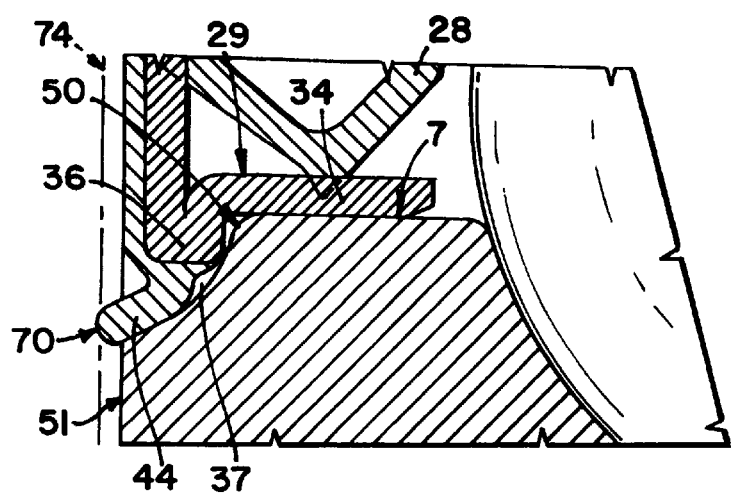
FIG. 2 illustrates schematically, to an enlarged scale, a detail of the bearing of FIG. 1.
Figure 3:
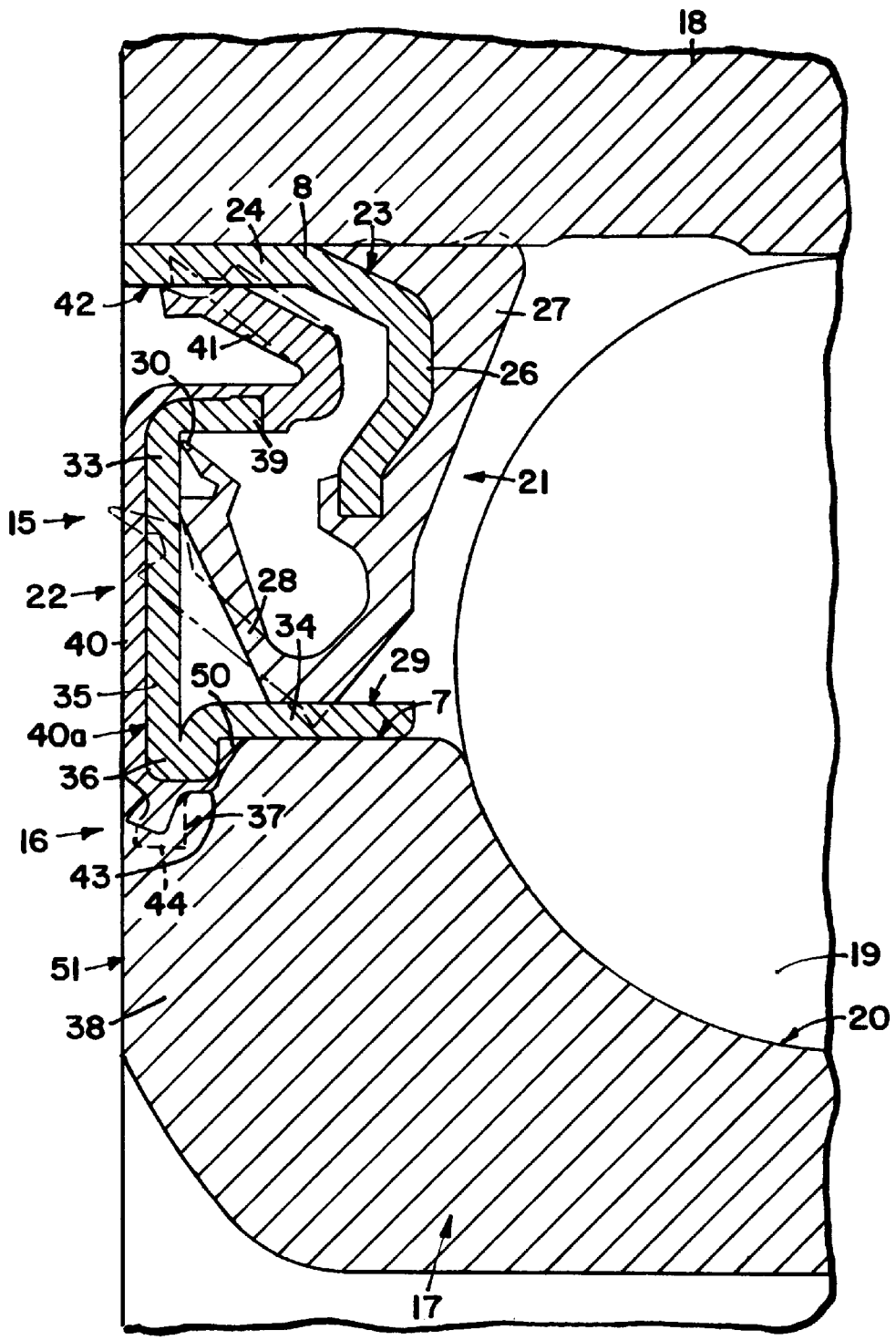
Figure 4:
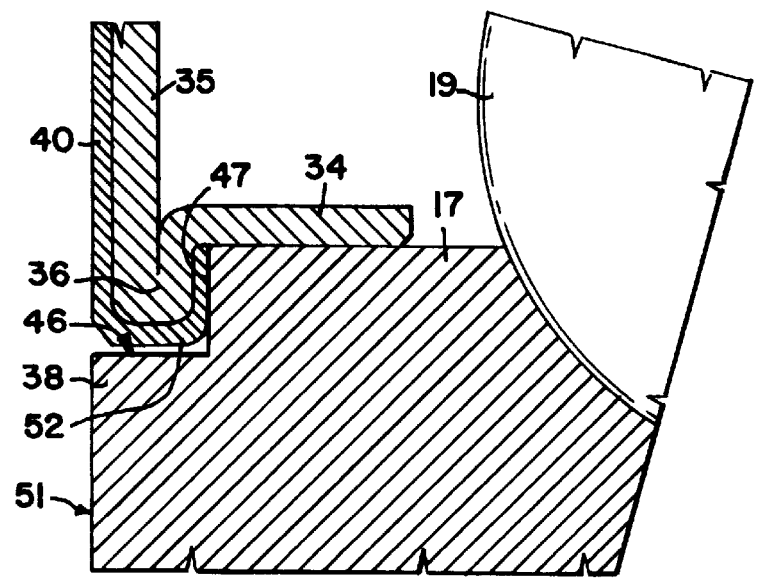
Figure 5:
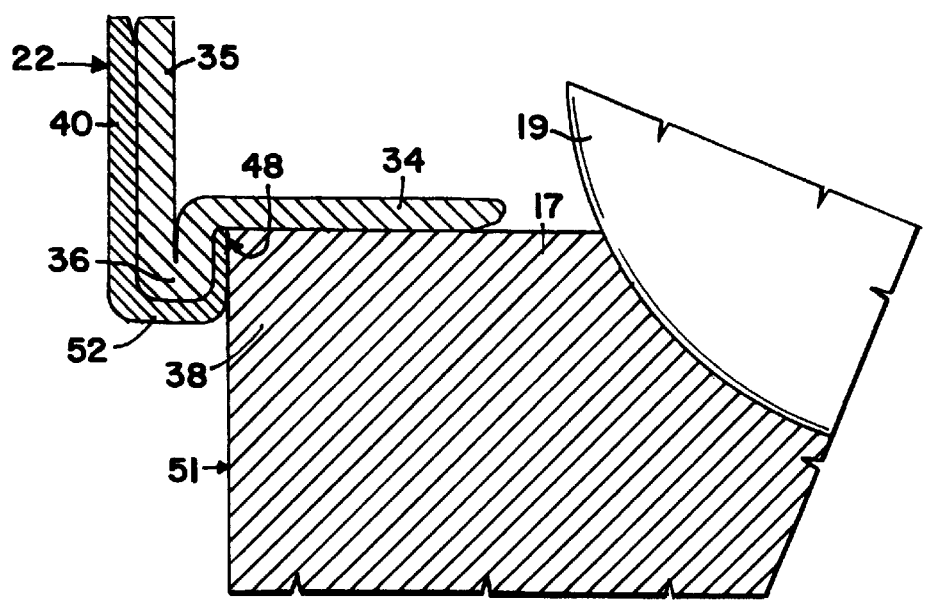

FIG. 3 in an axial cross-sectional view of a rolling bearing equipped with the sealing assembly of this invention;

FIG. 4 illustrates the same detail of FIG. 2 for a bearing according to a first possible variant embodiment of this invention; and FIG. 5 illustrates the same detail of FIG. 4 according to a further possible variant of this invention.

Figure 1:
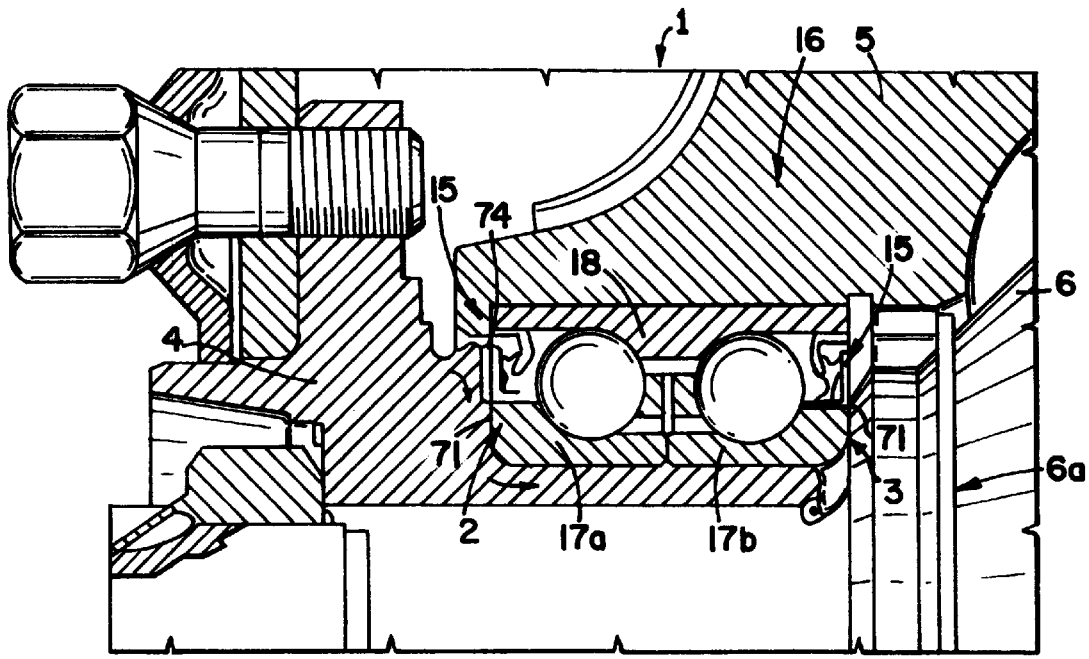
FIG. 1 is a partial axial sectional view of a wheel hub fitted with a bearing equipped with a sealing assembly according to the invention.

Referring to FIGS. 1, 2 and 3, reference number 16 indicates overall a rolling bearing for a vehicle suspension 1 (FIG. 1). The bearing is designed so as to receive at each end 2, 3 thereof a sealing assembly 15 according to the invention.

The bearing 16 comprises an inner race 17, of the kind divided into two annular portions 17a and 17b located side to side and fixed for rotation on a wheel hub 4 of the suspension 1, an outer race 18 secured to the knuckle 5 of suspension 1, and a plurality of rolling bodies 19 housed in a cavity 20 defined between races 17 and 18. In this way, the wheel hub 4 is rotatably mounted to the suspension knuckle 5, the outer race 18 of bearing 16 being in use stationary and integral to the suspension knuckle 5, the inner race 17 rotating fast with the wheel hub 4.

Sealing assembly 15, illustrated to an enlarged scale in FIG. 3, is mounted within each end portions 2, 3 of bearing 16, for hermetically sealing either opposite and of the cavity 20 defined between races 17 and 18, and to protect the rolling bodies 19 from foreign polluting agents and keep lubricating grease within the bearing 16.

Each sealing assembly 15 comprises a first shield 21 fixedly mounted to the stationary race 18 and a second shield 22 fixedly mounted to the rotating race 17 (to the race portion 17a in FIGS. 2 and 3).

Particularly, the first shield 21 comprises a rigid support 23, for example of metallic material, having a coupling sleeve portion 24 interference fitted in a cylindrical seat defined by an inner side wall 8 of stationary race 18, and a flange portion 26 projecting radially towards the inner race 17 from an end of sleeve portion 24 facing in use the inside of cavity 20, flange portion 26 is shaped concave, its concavity facing in use the outside of the bearing.

The first shield 21 further comprises a sealing member defined by an elastomeric coating 27 (for example glued during a vulcanizing step) supported by flange portion 26 so a to cover completely, the face of flange portion 26 facing the cavity 20. The coating 27 extent axially from flange portion 26 with the shape of a spur-shaped portion to be interference coupled with seat 8, thereby providing static sealing action therewith. The coating 27 comprises at least one elastically yieldable annular sealing lip 28, of known kind, adapted for sliding with interference and hermetically co-operate with respective sealing surfaces 29 and 30 of the second shield 22. in the non-limiting example in the drawings, lip 28 has V-shaped radial cross-section in a non-deformed condition, as shown in FIG. 3.

Particularly, the second shield 22 comprises a rigid support 33, for example made of blanked, bent metal material. The support 33 comprises a coupling sleeve portion 34, the radially outer surface of which defines the cylindrical sealing surface 29 diposed coaxial to and facing the sleeve portion 24 of shield 21. The rigid support 33 further comprises a flange portion 35 radially projecting towards the sleeve portion 24 of shield 21 from the end of sleeve portion 34 farther from cavity 20. Flange portion 35 is substantially perpendicular to sleeve portion 34 and provides in turn an annular end portion 39 folded at a 90° angle to the cavity 20.

According to a first aspect of the invention, sleeve portion 34 is directly interference fitted in a cylindrical seat defined by a radially outer surface 7 of the rotating race 17, coaxial to and facing the surface 8. in this arrangement, a metal-on-metal coupling is extended to the whole seat 7. Moreover, the flange portion 35 and the sleeve portion 34 are joined therebetween by means of an interposed annular a joining appendix 36, which is defined by a U-shaped bend of the metallic material for support 33. The bend in oriented in a radially inward direction, so that the apendix 36 projects radially from the flange portion 35 beyond the sleeve portion 34. According to a further aspect of the invention, the adjoining appendix 36 is adapted for engaging in use (FIGS. 2 and 3) an annular or 37 formed in the axially outer and edge 38 of rotating race 17 and delimiting the seat 7. Chamfer 37 and cylindrical meat 7 are radiused by a mating surface 50 providing an axial abutment for a appendix 36, with a metal/metal coupling.

In this example, the mating surface 50 is curved and shaped so as to define annular concavity facing the outside of the bearing furthermore, the chamfer 37 defines in turn the axial extension of the seat 7 which, in absence of chamfer 37, would prolong to the edge 38. Therefore, the seat 7 of bearing 16 according to the invention has a much more limited area as compared to that of seat 8.

The shield 22 further comprise an elastomeric coating 40 covering the flange portion 35 of support 33 an the side opposite to cavity 20. coating 40 provides a front surface 40a adapted to be located, in use, substantially flush to a front surface 51 of the rotating race 17.

Further, the coating 40 extends also to the folded portion 39 and forms, near this and portion, a radial sealing lip 41 curved towards race 18. Lip 41 projects radially from end portion 39 to slide with interference against a sliding and sealing surface 42 defined by the inner cylindrical side surface of sleeve portion 24 of the sport 23, coaxial to an facing the folded end portion 39.

According to a further aspect of the invention, the coating 40 forms a sealing means at the adjoining appendix 36. This sealing mans is defined by an annular lip 44 projecting radially from the free end of adjoining appendix 36 like a continuation thereof in the same direction. Consequently, such appendix on lip 44 is adapted in use to be gripped radially between the a appendix 36 formed by the above-mentioned U-shaped bend formed on support 33 and the curved mating surface. 50 defining the chamfer 37, following force fitting of the sleeve portion 34 into the seat 7 of race 17.

In this manner, the following advantages are simultaneously attained according to the invention:

(a) a secure fixing (with angular and axial locking) of shield 22 the rotating race 17, owing to the metal-metal coupling extended to the entire length of seat 7 and sleeve portion 34. This allows the shield 22 to act efficiently an a centrifuging element due to the shape of the end portion 39 and the relevant lip 41;

(b) the shield 22 can be positioned axially with accuracy relative to the race 17 and the other shield 21, as the relative axial position of race 17 and shield 22 is not by the axial abutment, preferably metal-on-metal, of radial appendix 36 and mating surface 50. further, as surface 50 is curved and the appendix 36 is defined by a U-shaped bend of support 33, the contact between the appendix 36 and the mating surface. 50 in theoretically linear and so guarantees high accuracy in the positioning of shield 22;

(c) fluid tight sealing in achieved by the coupling of shield 22 with race 17, without modifying the axial positioning of the shield 22. In fact, the concave shape of the curved mating surface 50 allows the elastomeric annular appendix 44 to remain radially compressed and pinched with interference between the free end of appendix 36 and surface 50, and deforms within the annular space defined by chamfer 37. In this way, infiltration of water or polluting agent between the sleeve portion 34 and the rotating race 17 is prevented.

According to a preferred embodiment of the invention, the annular appendix 44 and the chamfer 37 are so dimensioned such that, following coupling, the elastomeric appendix 44 deforms as shown in FIG. 2, so as to project axially with an end portion 70 thereof toward the outside of bearing 1. Particularly, the end portion 70 protrudes axially with respect to the front surface 51 of rotating race 17 and to such an extent for it to co-operate abutting against a radial front surface 74 of wheel hub 4, depicted in phantom line in FIG. 2.

Therefore, according to the invention, a watertight frontal and axial coupling in provided as schematically indicated at points 71 in FIG. 1, between the wheel hub 4 and the bearing 16 at the sealing assembly 15 carried by race portion 17a. The same action is achieved between the bearing 16 and a bell-shaped portion 6 of a homokinetic coupling 6a of suspension 1 (at the sealing anally 15 carried by race portion 17b, shown only in FIG. 1, but identical and symmetrical to what in shown in FIGS. 2 and 3). Such a watertight coupling prevents any infiltration of water or contaminants into the bearings 16 through the junction between race portions 17a and 17b, along the path indicated by the arrows in FIGS. 1 and 2.

Finally, as shown in FIG. 3, the coating 40 can optionally extend to appendix 36 with an intermediate portion 43 disposed between the adjoining appendix 36 and the curved surface 50. This arrangement avoids a direct axial contact between two metal parts (which, in case of repeated mounting and dismounting, could be subjected to wear) and provides a further sealing action in addition to that already given by appendix 44.

In the variant embodiment of FIG. 4, the rotating race 17 provides in the place of the chamfer 37, a step-shaped groove 46 having an axially countersunk surface 47 substantially flat and parallel to the front surface 51 of rotating race 17. Surface 47 defines an axial abutment for the adjoining appendix 36 of second shield 22. Appendix 36 is completed seated within 46, with the coating 40 disposed substantially flush with this bearing front surface 51. Coating 40 also forms an end portion 52 covering the entire adjoining appendix 36 and interposed between this and surface 47, thereby providing sealing action.

In the variant embodiment of FIG. 5, the edge 38 of rotating race 17 is free of chamfers or grooves and defines a corner 48. the adjoining appendix 36 is disposed axially abutting directly against the front surface 51 of rotating race 17, at corner 48. Cosequently, the flange portion 35 of the second shield 22 projects axially from the bearing 16 beyond front surface 51 and faces directly the wheel hub 4. This solution provides for a greater space for accommodating the sealing lip 28. Moreover, also in this case, the costing 40 forms an end portion 52 covering the entire adjoining appendix 36, and interposed between this and the front surface 51, providing sealing action between the sleeve portion 34 and the race 17. As the coating 40 on flange portion 35 faces the wheel hub 4, it can directly co-operate against wheel hub surface 74, performing a sealing action similar to that provided by the end portion 70 in the embodiment of FIG. 2. Therefore, water leakage between race portions 17a, 17b and the wheel hub 4 is also prevented.

From the foregoing description, the advantage of the sealing assembly of this invention will be apparent. First of all, the axial fixing of the second shield 22 on the rotating race 17 is improved as, in addition to the radial coupling (metal-metal) of the sleeve portion 34 with rotating race 17, an axial restraint is provided by the coupling between the appendix 36 and the suitably shaped edge 38. The particular shape of appendix 36 renders the support 33 of second shield 21 more resistant, making it less likely to be accidentally damaged, especially when being forcefully fitted in the seat 7.

Finally the provision of a portion or protrusion of the elastomeric coating between the appendix 36 and the edge 48 insures correct sealing action and prevents water leakage also in case of o axial play between the sleeve portion 48 and the rotating, race 17. This avoids to have to observe excessively low limits for working tolerances.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples.

What is claimed is:

1. A sealing assembly for a rolling bearing, said bearing comprising a first and a second race defining therebetween a cavity housing rolling bodies, said sealing assembly comprising a first shield with a rigid support to be fitted to said first race, said support comprising an axial sleeve portion to be interference fitted in a cylindrical seat of the first race, and a radial flange portion extending towards said second race, said axial sleeve portion and said radial flange portion being joined by an annular adjoining appendix defined by a U-shaped bend of the support, said appendix radially projecting from the flange portion beyond the sleeve portion so as to provide an axial stopping means cooperating with a mating surface of said first race to axially lock said first shield with respect to said first race;

said first shield further comprising elastomeric sealing means projecting from the free end of the adjoining appendix so as to be gripped, in use, between said axial stopping means and said mating surface to provide fluid tight connection between said first shield and said first race of the bearing.

2. A sealing assembly according to claim 1, wherein said elastomeric sealing means comprise an annular lip radially projecting from the free end of said adjoining appendix as a radial extension thereof for being radially gripped, in use, between said adjoining appendix of the support and aid mating surface.

3. A sealing assembly according to claim 2, wherein said elastomeric sealing appendix is part of an elastomeric coating integral with said support, said support further comprising an interposing portion covering said adjoining appendix of support to be interposed in use between said appendix and said mating surface.

4. A sealing assembly according to claim 1, wherein said support is made of blanked, bent metal material.

5. A sealing assembly according to claim 1, wherein said elastomeric sealing means comprise an elastomeric coating integral with said support and having an end portion covering entirely said adjoining appendix of the support, said end portion of the elastomeric coating being adapted to be interposed in use between the adjoining appendix and said mating surface.

6. A sealing assembly according to claim 1, comprising a second shield fixable to said second race, said second shield comprising a respective rigid support comprising an axial sleeve portion fixable with interference in a seat of the second race, and a radial flange portion extending towards said first race; the support of the first shield being provided with a radially outer end portion folded at a 90 degree angle towards the second shield and carrying a projecting sealing lip cooperating with a respective sealing surface of said second shield.

7. A rolling bearing, comprising a first and a second race defining therebetween a cavity housing rolling bodies, and at least one sealing assembly interposed between said first and second races at an end of the bearing for sealing said cavity, said sealing assembly comprising a first shield with a rigid support fitted to said first race, said support comprising an axial sleeve portion interference fitted in a cylindrical seat of the first race, and a radial flange portion extending towards said second race, said axial sleeve portion and said radial flange portion being joined by an annular adjoining appendix defined by a U-shaped bend of the support, said appendix radially projecting from the flange portion beyond the sleeve portion so as to provide an axial stopping means cooperating with a mating surface of said first race to axially lock said first shield with respect to said first race; said first shield further comprising elastomeric sealing means projecting from the free end of the adjoining appendix and gripped between said axial stopping means and said mating surface to provide fluid tight connection between said first shield and said first race of the bearing.

8. A bearing according to claim 7, wherein the first race has an axially outer end edge with an annular chamfer delimited by a curved surface, having its concavity facing the outside of the bearing and constituting said mating surface.

9. A bearing according to claim 7, wherein the first race has an axially outer end edge with a step-shaped groove, said groove having an axially inner radial flat surface parallel to a radial front surface of the first race defining said edge, said flat surface constituting said mating surface.

10. A bearing according to claim 7, wherein said elastomeric sealing means comprise an elastomeric coating for said support, and a sealing annular lip radially projecting from the free end of said adjoining appendix as a radial extension thereof.

11. A bearing according to claim 10, wherein an end portion of said annular lip is axially projecting relative to a front surface of the first race.

12. A bearing according to claim 7, wherein the first race has an axially outer end edge delimited by a flat front surface, said first shield being mounted projecting from said front surface, the latter constituting said mating surface, with said elastomeric coating facing the outside of the bearing.

* * * * *

UNITED STATES PATENT AND TRADEMARK OFFICE
CERTIFICATE OF CORRECTION

PATENT NO. : 6,082,905
DATED : July 4, 2000
INVENTOR(S) : Vignotto et al.

It is certified that error appears in the above-identified patent and that said Letters Patent is hereby corrected as shown below:

Title page,
Item [75], under Inventors "Turin" should read -- Torino --, and "Giaveno" should read -- Torino --

Column 1,
Line 9, "bearings a" should read -- bearings are --
Line 30, "my" should read -- may --
Line 40, "came" should read -- case --
Line 57, "ring" should read -- bearing --
Line 60, "intererece" should read -- interference --
Line 62, "maid" should read --said --, and "azial" should read -- axial --
Line 65, "mans" should read -- means --

Column 2,
Line 13, "about" should read -- abutment --
Line 18, insert -- be -- after the word "now"
Line 50, "and" should read -- end --

Column 3,
Line 2, "a" should read -- as --
Line 3, "extent" should read -- extends --
Line 17, "diposed" should read -- disposed --
Lines 30 and 31, "a joining" should read -- adjoining --
Line 37, "or" should read -- chamfer --, and "outer and" should read -- outer end --
Line 39, "meat" should read -- seat --
Line 40, delete "a" after the word "for"
Line 49, "comprise" should read -- comprises --
Line 50, "an" should read -- on --
Line 55, "this and" should read -- this end --
Line 59, "sport" should read -- support --, and "an" should read -- and --
Line 63, "mans" should read -- means --
Line 67, delete "a" after the word -- the --

UNITED STATES PATENT AND TRADEMARK OFFICE
CERTIFICATE OF CORRECTION

PATENT NO. : 6,082,905
DATED : July 4, 2000
INVENTOR(S) : Vignotto et al.

It is certified that error appears in the above-identified patent and that said Letters Patent is hereby corrected as shown below:

Column 4,
Line 8, insert -- on -- after the numeral "22"
Line 11, "an" should read -- as --
Line 15, "not" should read -- set --
Line 17, "further" should read -- Further --
Line 38, "1" should read -- 16 --
Line 49, "anally" should read -- assembly --
Line 51, "what in" should read -- what is --
Line 53, "bearings" should read -- bearing --

Column 5,
Line 10, "the" should read -- The --
Line 40, "o" should read -- some --

Column 6,
Line 7, "aid" should read -- said --

Signed and Sealed this

Twenty-eighth Day of May, 2002

*Attest:*

JAMES E. ROGAN
*Attesting Officer*   *Director of the United States Patent and Trademark Office*